(12) United States Patent
Minami et al.

(10) Patent No.: US 6,798,555 B2
(45) Date of Patent: *Sep. 28, 2004

(54) FULLY SOLID ELECTROCHROMIC ELEMENT

(75) Inventors: Chihiro Minami, Shizuoka (JP); Takuo Mochizuka, Shizuoka (JP); Akihiko Fukazawa, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,350

(22) PCT Filed: Oct. 5, 2001

(86) PCT No.: PCT/JP01/08797

§ 371 (c)(1),
(2), (4) Date: May 29, 2003

(87) PCT Pub. No.: WO03/032068

PCT Pub. Date: Apr. 17, 2003

(65) Prior Publication Data

US 2004/0042059 A1 Mar. 4, 2004

(51) Int. Cl.⁷ .................................................. G02F 1/15
(52) U.S. Cl. ....................................... 359/265; 359/271
(58) Field of Search ................................. 359/265, 267, 359/266, 269, 271, 273, 275

(56) References Cited

U.S. PATENT DOCUMENTS 5,923,457 A * 7/1999 Byker et al. ................ 359/271

FOREIGN PATENT DOCUMENTS

| JP | 60-98481 | 6/1985 |
|----|----------|--------|
| JP | 1-172887 | 7/1989 |
| JP | 10-71891 | 3/1998 |

* cited by examiner

*Primary Examiner*—Scott J. Sugarman
*Assistant Examiner*—Richard Hanig
(74) *Attorney, Agent, or Firm*—Oblon, Spivak, McClelland, Maier & Neustadt, P.C.

(57) ABSTRACT

A tapping electrode for a lower electrode film and a tapping electrode for an upper electrode film are provided on one side of an area around a substrate. By placing the electrode-tapping elements on one side, for example, applying the electrochromic element to an automobile antiglare mirror, the effective field of the mirror is increased to contribute to safety. A mirror ring that surrounds the outer circumference of the mirror can be made slim, enhancing a smart look from the viewpoint of design. Also, in comparison with a case in which the electrode is tapped on two or more sides, the present design makes it possible to secure the same effective visibility with a lightweight design.

10 Claims, 5 Drawing Sheets

FULLY SOLID ELECTROCHROMIC ELEMENT

TECHNICAL FIELD

The present invention relates to an electrochromic element to be used in the control of luminous energy and in a display, and particularly to a whole solid type electrochromic element.

BACKGROUND ARTS

The phenomenon that an electrolytic oxidation or an electrolytic reduction reversibly occurs upon applying a voltage to be reversibly colored or discolored refers to electrochromism. An electrochromic (hereinafter sometimes referred to as "EC") element utilizing such a phenomenon has been used in an element for regulating luminous energy (e.g., an antiglare mirror, a dimmer glass, and a meter, a brightness control element, e.g., an EL display element), number display utilizing a segment, and a display element such as an electrochromic display. Depending upon the state of EC layers constructing the EC element, the EC element can be roughly divided into a liquid type, a gel type, and a whole solid type. Amongst them, the element in which all the EC layers including an ion conductive layer are composed of thin solid films is the whole solid type EC element.

FIG. 9 shows a typical configuration of the whole solid type EC element. Outlining the configuration, on a transparent substrate 1 are provided a lower electrode layer 2, and an EC layer 3 comprising an oxidative chromic film which colors due to the oxidation reaction, a solid electrolyte film serving as an ion conductive film and a reductive chromic film which colors due to the reduction reaction, and an upper electrode film 4 in this order. In the case of a reflective type EC element, either of the lower electrode film 2 and the upper electrode film 4 is transparent, while in the case of a transmission type EC element, both of the lower electrode film 2 and the upper electrode film 4 are transparent. These films are usually sealed with a sealing resin (not shown) as a whole, and a sealing glass (not shown) is adhered on the rear surface of the sealing resin for chemical and physical protection.

When a voltage is applied between the lower electrode film 2 and the upper electrode film 4 of the EC element thus produced, an electrically chemical reaction occurs within the EC layer 3, which is chromic layer, to color the element. Upon applying a voltage in a reverse direction to the coloration, the EC element is discolored due to the reverse reaction.

As shown in FIG. 9, with regard to tapping the electrodes in order to connects the lower electrode film 2 and the upper electrode film 4 of the EC element to external wires, the lower electrode film 2 and the upper electrode film 4 are formed with shifting the patterns, whereby the ends of the lower electrode film 2 and the upper electrode film 4 are exposed on both ends of the substrate 1, taking the exposed portion of the lower electrode film 2 as a tapping electrode 2a for the lower electrode film 2, and the exposed portion of the upper electrode film 4 as a tapping electrode 4a for the upper electrode film 4. At present, a manner is applied that external wires are connected to these tapping electrodes 2a and 4a via a clip electrode 5, etc. FIG. 8 shows an example in which this configuration is applied to an automobile antiglare interior mirror, tapping electrodes (not shown) for respective electrode films are provided on two opposite sides 1a and 1b of the substrate 1, and external wires are connected to the tapping electrodes via a clip electrode 5 and a conductive wire 5', respectively. From the viewpoint of securing sufficient response as the antiglare element through the lower electrode film 2, the upper electrode film 4, and the like, such a manner has been applied that a tapping electrode for one electrode film is provided on two or three sides of the substrate, and a tapping electrode for the other electrode film is provided on the other side (Japanese Patent Laid-Open Publication No. 8-229856).

However, the above manner has the disadvantage, for example, in the case of the automobile antiglare mirror, that there are tapping regions on a plurality of sides of the substrate, and the areas of the tapping electrode regions are large, decreasing an effective area which can be come out on the mirror and narrowing the effective view field which can be secured. Also, the problem occurs that the length of the wire becomes large.

When a luminophor element is piled up on the EL element in order to control the brightness of a luminophor element (electroluminescence (EL) luminophor, LED, Braun tube, various displays, etc.), the problem sometimes occurs that tapping of the electrode is provided only with difficulty depending upon the construction of the luminophor element, e.g., a luminophor element which requires an electrode-tapping only from one side.

SUMMARY OF THE INVENTION

In the present invention, coming up with various technical ideas for the film formation configuration and the positions of the electrodes, and as a result, an effective area for the coloration and discoloration of the EC element can be widened without impairing the performance of the EC element, which can never attain the prior art, by providing the tapping electrode only on one side. By intensively arranging the tapping electrode on one side, the wiring becomes easy and the length of the wiring can be shortened.

For example, in the case of the automobile antiglare mirror, the effective area for the mirror portion is increased to widen the effective view field, contributing the safety. What is more, a mirror ring which covers the outer circumference of the mirror can be made slim, enhancing a smart looking from the viewpoint of the design. Also, in comparison with the case where the electrode tapping is carried out on two or more sides, the present invention makes it possible to secure the same effective visibility with a lightweight.

Also, for example, if the EC element of the present invention is used for controlling the brightness of the luninophor element, by intensively arranging the electrode tapping on one side, the electrode can be tapped only within a restricted space, making it possible to control the brightness of luminophor element which requires the tapping of the electrode only from one side (such as meters and EL display elements), such a control being difficult in the prior art.

BEST MODES FOR CARRYING OUT THE INVENTION

The present invention is characterized in that a tapping electrode for the lower electrode film and a tapping electrode for the upper electrode film are provided on one side of the area around substrate outside of the effective area, which exhibits the functions as EL element.

Figure 1:
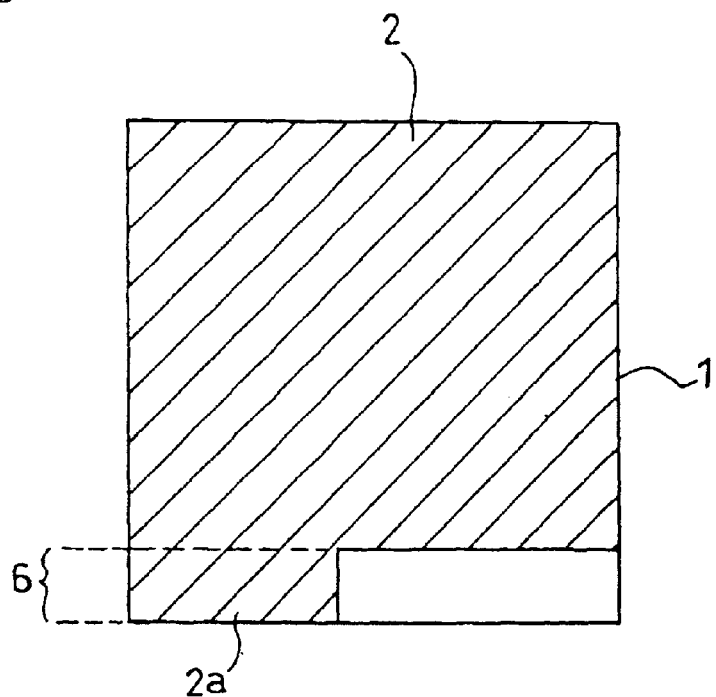
FIG. 1 and FIG. 2 each is a plane view for explaining the configuration of the electrochromic element according to one embodiment of the present invention.
Figure 2:
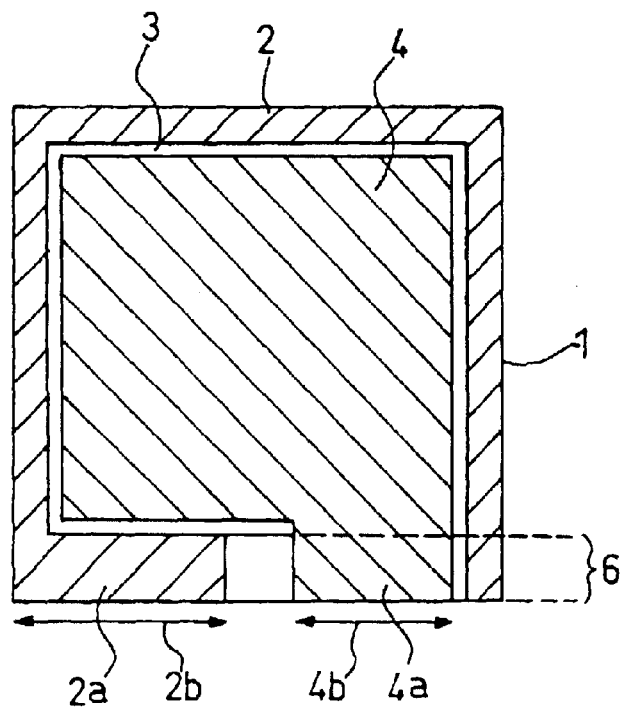
Figure 3:
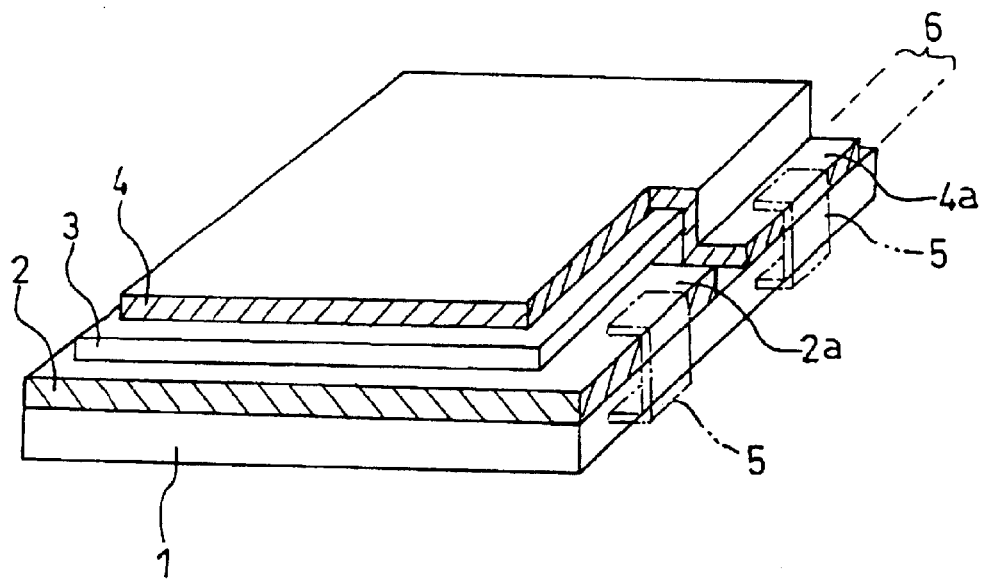
FIG. 3 is a perspective view outlining the configuration of the electrochromic element according to one embodiment of the present invention.

In this case, a device is made to a configuration of the film formation pattern and the position of the electrode. Specifically, for example, as shown in FIG. 1, a tapping electrode 6 is set at one side of the edge region of a substrate 1, a lower electrode film 2 is formed on a part of the tapping electrode region 6 in such a manner that the lower electrode film 2 is sticking out from the tapping electrode to form a tapping electrode 2a for the lower electrode film 2. In addition, as shown in FIG. 2, when an EC film 3 is formed thereon and an upper electrode film 4 is further formed thereon, the upper electrode film is formed on the tapping electrode region 6 except for being overlapped with (in contact with) the tapping electrode 2a for the lower electrode film 2 to provide a tapping electrode 4a for the upper electrode film 4. The perspective view of the resulting EC element is given in FIG. 3. In FIG. 3, the same references are given as in FIGS. 1 and 2.

In order to obtain the film pattern configuration described above, for example, a film formation process utilizing a mask to form the lower electrode film 2 and the upper electrode film 4 with different patterns (e.g., mask deposition) can be mentioned. The most preference is given to use a process in which after the lower electrode film 2 is temporarily formed on the whole surface of the substrate, a pattern is formed by a photolithographic etching method, and the upper electrode film 4 is formed utilizing a mask. This is because no mask is required for the pattern formation of the lower electrode 2, which reduces the cost, and the use of a mask for the pattern formation of the upper electrode film 4 contributes the cost reduction in comparison with the photolithographic etching method.

Figure 9:
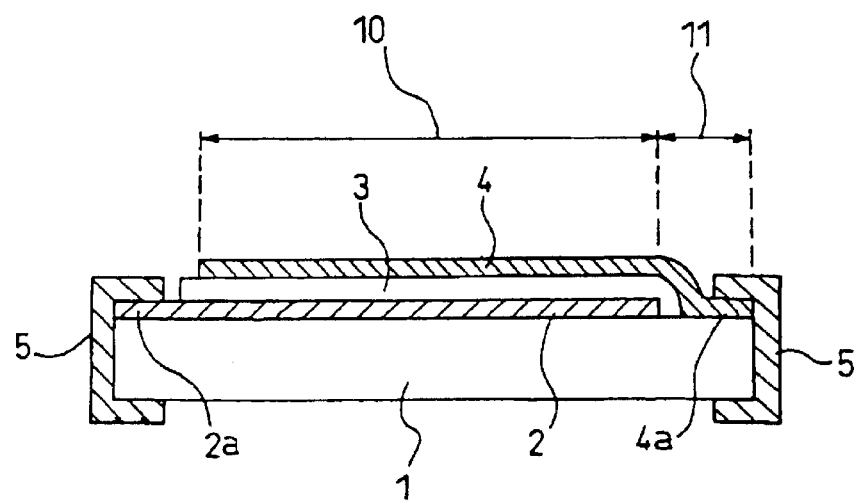
FIG. 9 is a cross-sectional view showing a typical whole solid type EC element.

When the tapping electrode region is set on one side of the region around the substrate, the side on which the tapping electrode of the upper electrode film is preferably formed is set as the tapping electrode region. Referring to FIG. 9, at the side on which the tapping electrode 4a of the upper electrode film 4, a region 11 around the substrate outside of the effective area 10, which exhibits the function as the electrochromic element, is originally wider than other sides and, thus, such setting is advantageous.

In the present invention, it is preferable to set the tapping electrode area on the long side of the substrate, which makes it possible to secure sufficient lengths and areas of upper and lower tapping electrodes, which, in turn, makes it possible to secure sufficient stability of voltage, stability of coloration and discoloration, reliability and response.

In the present invention, the resistance of the transparent electrically conductive film making up the lower and upper electrode films is preferably not higher than 15 $\Omega/\square$, in particular, in order to satisfy good response, it is required to be below 10 $\Omega/\square$ In the present invention, the area of the electrically conductive film is preferably not higher than 30 cm square (30 cm×30 cm). Although the area of the transparent electrically conductive film depends upon the sheet resistance of the transparent electrically conductive film, when the resistance of the transparent electrically conductive film presently known is used and when the area of the transparent electrically conductive film is set to be 30 cm square (30 cm×30 cm), it is difficult to secure stability of voltage, stability of coloration and discoloration, reliability and response in the embodiment of the present invention where the tapping electrodes are all provided on the one surface. From a similar viewpoint, the area of the transparent electrode is preferably not more than 500 cm$^2$, more preferably not more than 350 cm$^2$, and still more preferably not more than 250 cm$^2$. In the case where the transparent electrically conductive film is rectangle and the tapping electrode areas are provided on a long side of the transparent electrically conductive film, the length of the long side of the transparent electrically conductive film may be longer than 30 cm, but the length of the short side thereof is preferably up to 30 cm.

In the present invention, the length of each tapping electrode (2n and 4b in FIG. 2) preferably has a length so that two or more clip electrodes can be fit to the tapping electrode. This is because the connection can be maintained even if one of clip electrodes becomes contact failure. Particularly, in the case of an EC element for an automobile application, the clip electrode has a higher possibility to be contact failure due to vigorous vibration, this is important.

In the present invention, the length and the area of the each tapping electrode (2b and 4b in FIG. 2) are preferably designed to be a proportion for attaining stabilized voltage and stabilized coloration/discoloration to meet the resistance of the thin film (face resistance). Specifically, for example, the length (area) of the tapping electrode portion of the transparent electrode such as ITO electrode is set at large, and that of the film serving as an electrode and a reflecting film such as aluminum, is set at smaller than the former.

In the present invention, when the material of each electrode film is the same, the lengths and areas of the tapping electrodes (2b and 4b in FIG. 2) are preferably the same as each other for stabilizing the voltage and the coloration/discoloration.

Figure 4:
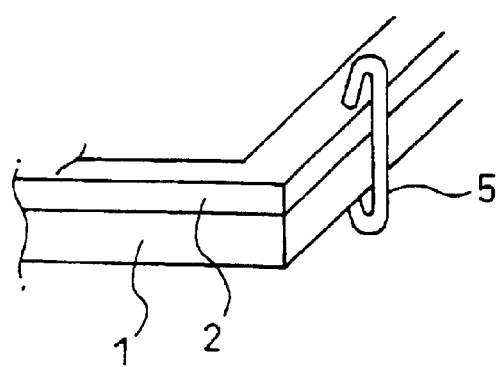
FIG. 4 is a perspective view showing another embodiment of the clip electrode.

In the present invention, each tapping electrode is preferably connected to the external wiring via a clip electrode from the viewpoints of the fact that connection can be carried out easily and securely and that such a connection can adaptable to the curvature etc. FIG. 4 shows another embodiment of the clip electrode. The clip electrode according to the embodiment shown in FIG. 4 has advantages of saving the man-hour, secured connection and the like.

In the present invention, the electrochromic layer is not specifically restricted as long as it functions as the whole solid type EC layer, and may be composed of an oxidative chromic film such as iridium oxides (IrO$_x$) and nickel oxides (NiO$_x$) solid electrically conductive film such as tantalum pentoxide (Ta$_2$O$_5$) and magnesium fluoride (MgF$_2$), and a reductive chromic film such as tungsten trioxide (WO$_3$) and molybdenum trioxide (MoO$_3$). Specifically, the electrochromic layer may be a three-layered structure comprising IrO$_x$—Ta$_2$O$_5$—WO$_3$ so that the layer is colorless in a usual state and is changed to blue at the time of exhibiting its antiglare property.

Metal films such as Al, Ag, and Cr can be used as the film serving as an electrode and reflecting film.

As the transparent electrically conductive film, a film made of ITO (indium/tin oxide), SnO$_2$, InO$_2$, ZnO, or such can be used.

These films can be formed by any of known thin film formation processes such as deposition, ion-plating, and plating processes.

Figure 5:
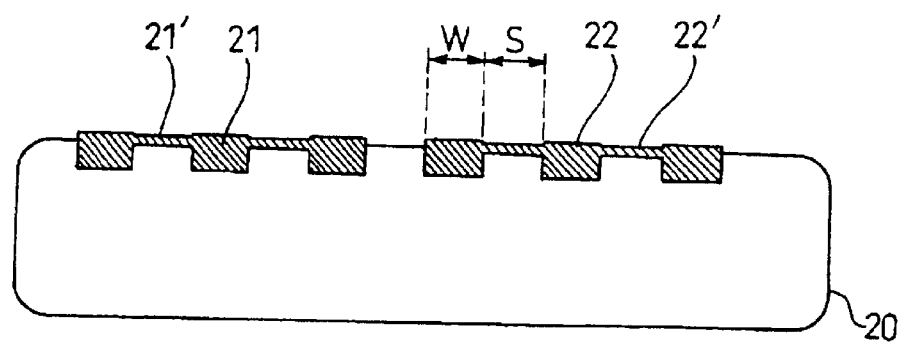
FIG. 5 is a plane view exemplifying the application of the present invention to an automobile antiglare mirror.

FIG. 5 is a plane view showing an example where the present invention is applied to an automobile antiglare mirror. As shown in FIG. 5, a tapping electrode (not shown) of the lower electrode film is provided on one side of a mirror 20, a clip electrode 21 and a conductor 21' are connected to the tapping electrode of the lower electrode film. Also, a tapping electrode (not shown) of the upper electrode film is provided on one side of a mirror 20, a clip electrode 22 and a conductor 22' are connected to the tapping electrode of the upper electrode film. These tapping electrodes are connected to external wires via these clip electrodes and the conductors, respectively.

A sample according to the present invention, which is prepared by forming an electrochromic layer three-layered structure comprising $IrO_x$—$Ta_2O_5$—$WO_3$ and an Al film for the film serving as an electrode and reflecting film onto a glass substrate having an ITO film with an interior mirror size of 250 mm×70 mm by a deposition process, can vary the reflectance from 10% to 70%, and has been confirmed to satisfy the functions of the antiglare mirror. In the automobile interior mirror, the width W of the clip electrode shown in FIG. 5 and the distance S between the clip electrodes is appropriately 1 mm.

Figure 6:
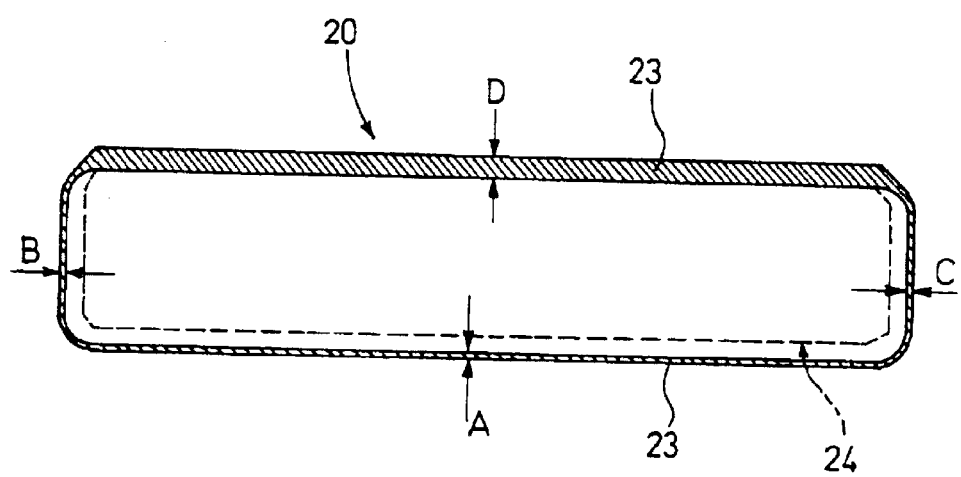
FIG. 6 is a plane view explaining the effect in the case of the application of the present invention to an automobile antiglare mirror.

FIG. 6 is a plane view explaining the effect in the case of the application of the present invention to an automobile antiglare mirror. As shown in FIG. 9, by making a mirror ring (vessel) 23, which covers the outer circumference of the substrate outside of the effective area of the mirror 20, slim, apparent smartness is improved in a design viewpoint. In FIG. 6, the rear outside from the dot line 24 shows an area which is covered with the conventional mirror ring. According to the present invention, it is possible to set A=B=C<D. At this time, at least one side of A, B, and C has a width half or less of the conventional width. This widens the effective view field and contributes the safety. Moreover, in comparison with the case of tapping electrodes on at least two sides, the weight can be reduced with the same effective view field.

As described above, the application of the present invention to the automobile interior mirror or exterior mirror is particularly preferable since these mirrors are required to appear to be smart.

Also, as shown in FIG. 6, it is preferable that the tapping electrode region resides on the side of the upper portion of the mirror at the time of fitting the mirror, because the mirror appear to be more smart if the tapping electrode area is placed on an upper portion of the mirror. Particularly, in the case of the interior mirror, even if the mirror ring above the mirror at the time of fitting the mirror is somewhat wide, the mirror, which does not look strange, is preferable.

The electrochromic antiglare mirror is not restricted to a flat type mirror, and may be a curved type mirror.

Figure 7:
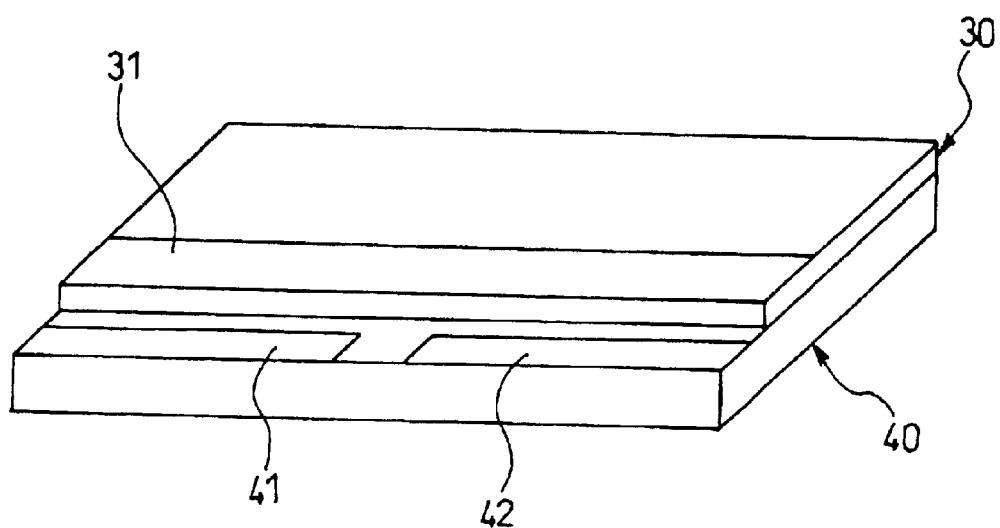
FIG. 7 is a perspective view exemplifying the application of the present invention to brightness control of an organic EL panel, which requires the electrode tapping from one side.
Figure 8:
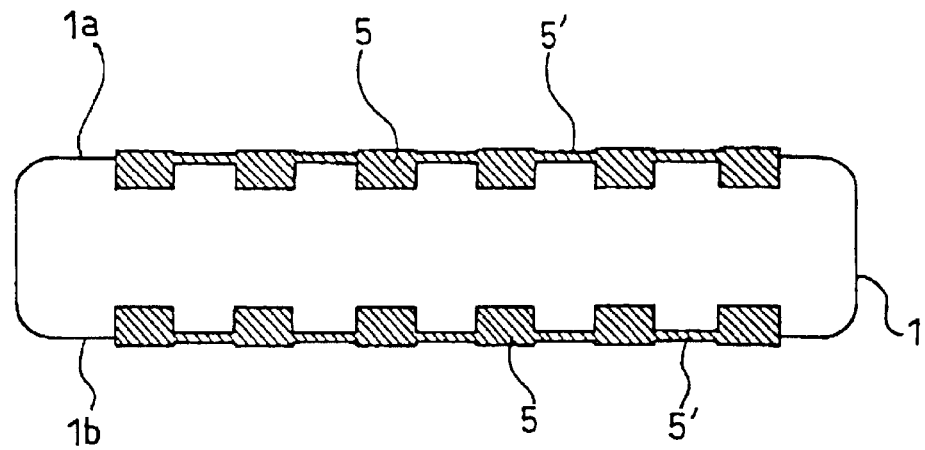
FIG. 8 is a perspective view exemplifying the application of the conventional manner to brightness control of an organic EL panel, which requires the electrode tapping from one side.

FIG. 7 is a perspective view exemplifying the application of the present invention to brightness control of an organic EL panel, which requires the tapping of the electrode from one side. As shown in FIG. 7, the position of a tapping electrode 31 of an EL panel 30 requires the tapping of electrode from one side. The EL element 40 of the present invention comprises a tapping electrode 41 of a lower electrode film and a tapping electrode 42 of an upper electrode film provided on one side of the EL element. In the case where the EL element 30 is laminated on the EL panel 30, by placing the tapping electrode 31 of the EL panel 30 and the tapping electrodes 41 and 42 of the EL element 40 on the same one side, all of the electrodes can be tapped from one side, which makes it possible to tap the electrodes within a restricted space. This also makes it possible to the control of the brightness of the EL panel, which requires the tapping of the electrodes from on side, and which has been difficult for the conventional technique.

In the sample of EC element 40 according to the present invention having a size of 300 mm×100 mm, transmission can be changed from 20% to 80%, confirming that the brightness control function is fully satisfied.

Industrial Applicability

The electrochromic element of the present invention is particularly available for use in an electrochromic antiglare mirror composed as an electrochromic mirror, particularly automobile inner and exterior mirror, and control of brightness and luminous energy of elements which is difficult to tap electrode from plural side depending upon its construction, such as chromic element required for tapping an electrode.

What is claimed is:

1. A solid electrochromic device comprising:

a substrate;

a lower electrode layer provided on the substrate and having a first short side and a first long side which is longer than the first short side, the lower electrode layer having a lower tapping electrode portion provided on the first long side;

an electrochromic layer provided on the lower electrode layer;

an upper electrode layer provided on the electrochromic layer and having a second short side and a second long side which is longer than the second short side and which is positioned to correspond to the first long side, the upper electrode layer having an upper tapping electrode portion provided on the second long side not to overlap the lower tapping electrode portion.

2. The solid electrochromic device as claimed in claim 1, wherein said upper electrode layer and said lower electrode layer are transparent.

3. The solid electrochromic device as claimed in claim 1, wherein said upper electrode layer and said lower electrode layer are made of a material which has a sheet resistance of at most 15 $\Omega/\square$.

4. The solid electrochromic device as claimed in claim 1, wherein each of the upper and lower tapping electrode portions is so dimensioned that at least two clip electrodes are fit.

5. The solid electrochromic device as claimed in claim 1, wherein each of the upper and lower tapping electrode portions is so dimensioned as to be able to stabilize voltage and coloration/discoloration of the electrochromic layer according to resistances of the upper and lower electrode layers.

6. The solid electrochromic device as claimed in claim 1, wherein the upper and lower electrode layers are made from a substantially same material and wherein the upper and lower tapping electrode portions have substantially same dimensions.

7. The solid electrochromic device as claimed in claim 1, wherein the liquid electrochromic device is a part of an automobile interior mirror or an automobile exterior mirror.

8. The solid electrochromic device as claimed in claim 1, wherein the upper and lower tapping electrode portions are positioned on a side of an upper portion of the automobile interior mirror or the automobile exterior mirror.

9. The solid electrochromic device as claimed in claim 1, wherein said electrochromic layer comprises, an oxidative chromic film, an electrode film provided on the oxidative chromic film, and a reductive chromic film provided on the electrode film.

10. The solid electrochromic device as claimed in claim 1, further comprising:

a brightness controller configured to control brightness of a light-emitting element which requires the upper and lower tapping electrode portions be positioned on a one side of the liquid electrochromic device.

* * * * *